United States Patent
Sun et al.

(10) Patent No.: US 7,352,812 B2
(45) Date of Patent: Apr. 1, 2008

(54) METHOD AND APPARATUS FOR CONTROLLING LOOP FILTERING OR POST FILTERING IN BLOCK BASED MOTION COMPENSATIONED VIDEO CODING

(75) Inventors: Shijun Sun, Vancouver, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 661 days.

(21) Appl. No.: 10/112,683

(22) Filed: Mar. 29, 2002

(65) Prior Publication Data
US 2002/0146072 A1   Oct. 10, 2002

Related U.S. Application Data

(63) Continuation of application No. 09/817,701, filed on Mar. 26, 2001.

(51) Int. Cl.
H04B 1/66 (2006.01)
(52) U.S. Cl. ............... 375/240.16; 375/240.2; 375/240.15; 375/240.14; 375/240.12; 348/699; 382/238; 382/236; 382/250
(58) Field of Classification Search ........... 375/240.16, 375/240.25, 240.12, 240.26, 240.14, 240.15, 375/240.18, 240.2; 348/699; 382/238, 268, 382/248, 236, 250
See application file for complete search history.

(56) References Cited

U.S. PATENT DOCUMENTS 5,072,293 A * 12/1991 De Haan et al. ............ 348/699
5,126,841 A * 6/1992 Tanaka et al. ......... 375/240.16
5,204,706 A * 4/1993 Saito .......................... 352/129
5,237,410 A * 8/1993 Inoue .................... 375/240.12
5,329,318 A * 7/1994 Keith ......................... 348/699
5,367,385 A * 11/1994 Yuan .......................... 358/465

(Continued)

FOREIGN PATENT DOCUMENTS

EP   0714209   5/1996

(Continued)

OTHER PUBLICATIONS

Derviaux C et al: "Blocking artifact reduction of DCT coded image sequences using a visually adaptive postprocessing," Proceedings of the International Conference on Image Processing (ICIP) Lausanne, Sep. 16-19, 1996, New York, IEEE, US, vol. vol. 1, Sep. 16, 1996, pp. 5-8 XP010202580 ISBN: 0-7803-3259-8* pp. 6-7, paragraph 2.1.2-paragraph 2.3*.

"H.26L Test Model Long Term No. 6 (TML-6) Draft 0" ITU-T Telecommunication Standardization Sector of ITU , Geneva, CH, Jan. 9, 2001, pp. 1-35, XP001O89815 *pp. 19-22, paragraph 4.5*.

(Continued)

Primary Examiner—Shawn S. An
(74) Attorney, Agent, or Firm—Krieger Intellectual Property, Inc.; Scott C. Krieger

(57) ABSTRACT

Adjacent blocks are identified in an image. Coding parameters for the adjacent blocks are identified. Deblock filtering between the identified adjacent blocks is skipped if the coding parameters for the identified adjacent blocks are similar and not skipped if the coding parameters for the identified adjacent blocks are substantially different.

21 Claims, 17 Drawing Sheets

U.S. PATENT DOCUMENTS

| | | | |
|---|---|---|---|
| 5,479,211 A | | 12/1995 | Fukuda |
| 5,543,848 A | * | 8/1996 | Murakami et al. ....... 348/416.1 |
| 5,565,921 A | | 10/1996 | Sasaki et al. |
| 5,737,019 A | * | 4/1998 | Kim ...................... 375/240.25 |
| 5,768,433 A | * | 6/1998 | Bolton ....................... 382/238 |
| 5,949,908 A | | 9/1999 | Sugahara |
| 6,041,145 A | * | 3/2000 | Hayashi et al. ............. 382/268 |
| 6,160,503 A | * | 12/2000 | Andrews et al. ............... 341/94 |
| 6,618,445 B1 | * | 9/2003 | Peng et al. ............ 375/240.25 |

FOREIGN PATENT DOCUMENTS

| | | |
|---|---|---|
| EP | 0777388 | 6/1997 |
| EP | 0838955 | 4/1998 |

OTHER PUBLICATIONS

Lee Y L Al: Loop- filtering and post- filtering for low bit-rates moving picture coding Image Processing, 1999. ICIP 99. Proceedings. 1999 International Conference on Kobe , Japan Oct. 24-28, 1999, Piscataway, NJ, USA, IEEE,US, vol. 1, Oct. 24, 1999, pp. 94-98, XPO10369215 ISBN: 0-7803-5467-2 * pp. 94-96, paragraph 2.-paragraph 3*.

Park H W et al: "A Postprocessing Method for Reducing Quantization Effects in Low Bit -Rate Moving Picture Coding" IEEE Transaction on Circuits and Systems for Technolgy, IEEE Inc. New York, US vol. 9, No. 1 Feb. 1999 , pp. 161-171,XPOOO8O2295 ISSN:1051-8215 * pp. 161-163, paragraph II-paragraph 111.A*.

* cited by examiner

Table 1. Comparison between TML and the proposed loop filtering scheme

| Video sequence | QP | Bitrate (bps) | | PSNR(Y) | | PSNR(U) | | PSNR(V) | | New loop filter |
|---|---|---|---|---|---|---|---|---|---|---|
| | | TML | SLA | TML | SLA | TML | SLA | TML | SLA | relative time saving |
| Akiyo_cif 300 frames @ 30fps | 25 | 33151 | 32346 | 34.050 | 34.161 | 38.934 | 39.042 | 40.300 | 40.369 | 63.0% |
| | 30 | 22775 | 22295 | 30.797 | 30.920 | 36.610 | 36.964 | 38.680 | 38.771 | 68.2% |
| Foreman_cif 300 frames @ 30fps | 25 | 165115 | 162740 | 30.835 | 31.006 | 38.124 | 38.174 | 38.966 | 39.030 | 43.1% |
| | 30 | 101357 | 100215 | 27.580 | 27.836 | 36.745 | 36.811 | 37.267 | 37.362 | 42.1% |
| Foreman_qcif 100 frames @ 10fps | 25 | 28681 | 28677 | 29.822 | 29.931 | 37.586 | 37.631 | 37.773 | 37.938 | 38.4% |
| | 30 | 15999 | 15822 | 26.250 | 26.435 | 36.432 | 36.323 | 36.222 | 36.283 | 41.3% |
| Tempete_cif 260 frames @ 30fps | 25 | 336200 | 329115 | 28.277 | 28.490 | 33.982 | 34.143 | 36.009 | 36.184 | 45.3% |
| | 30 | 168133 | 159789 | 24.583 | 24.927 | 32.334 | 32.628 | 34.512 | 34.799 | 50.6% |

FIG. 7

METHOD AND APPARATUS FOR CONTROLLING LOOP FILTERING OR POST FILTERING IN BLOCK BASED MOTION COMPENSATIONED VIDEO CODING

REFERENCE TO RELATED APPLICATIONS

This application is a continuation of U.S. patent application Ser. No. 09/817,701, entitled "METHOD AND APPARATUS FOR CONTROLLING LOOP FILTERING OR POST FILTERING IN BLOCK BASED MOTION COMPENSATIONED VIDEO CODING," and filed on Mar. 26, 2001.

BACKGROUND

Block based motion compensated video coding is used in many video compression standards such as H.261, H.263, H263+, MPEG-1, MPEG-2, and H26L. The lossy compression process can create visual artifacts in the decoded images, referred to as image artifacts. Blocking artifacts occur along the block boundaries in an image and are caused by the coarse quantization of transform coefficients.

Image filtering techniques can be used to reduce artifacts in reconstructed images. Reconstructed images are the images produced after being inverse transformed and decoded. The rule of thumb in these techniques is that image edges should be preserved while the rest of the image is smoothed. Low pass filters are carefully chosen based on the characteristic of a particular pixel or set of pixels surrounding the image edges.

Non-correlated image pixels that extend across image block boundaries are specifically filtered to reduce blocking artifacts. However, this filtering can introduce blurring artifacts into the image. If there are little or no blocking artifacts between adjacent blocks, then low pass filtering needlessly incorporates blurring into the image while at the same time wasting processing resources.

The present invention addresses this and other problems associated with the prior art.

SUMMARY OF THE INVENTION

Adjacent blocks are identified in an image. Coding parameters for the adjacent blocks are identified. Deblock filtering between the identified adjacent blocks is skipped if the coding parameters for the identified adjacent blocks are similar and not skipped if the coding parameters for the identified adjacent blocks are substantially different.

BRIEF DESCRIPTION OF THE DRAWINGS

FIG. 7 shows a table containing the results from selective deblock filter skipping.

DETAILED DESCRIPTION

In conventional filtering methods, filter processing only considers a single reconstructed image frame at a time. The motion-vector information available at both the encoder and decoder is not used. If two adjacent blocks share the same motion vector with respect to the same reference image frame, (for a multiple reference frames system) there may be no significant difference between the image residuals of each block. The block boundary of these two adjacent blocks may have been filtered in the reference frame and should therefore not be filtered again for the current frame. If a deblock filter is used without considering this motion-vector information, the conventional filtering process might filter the same boundary again and again from frame to frame. This unnecessary filtering not only causes unnecessary blurring but also results in extra filter computations.

Figure 1:
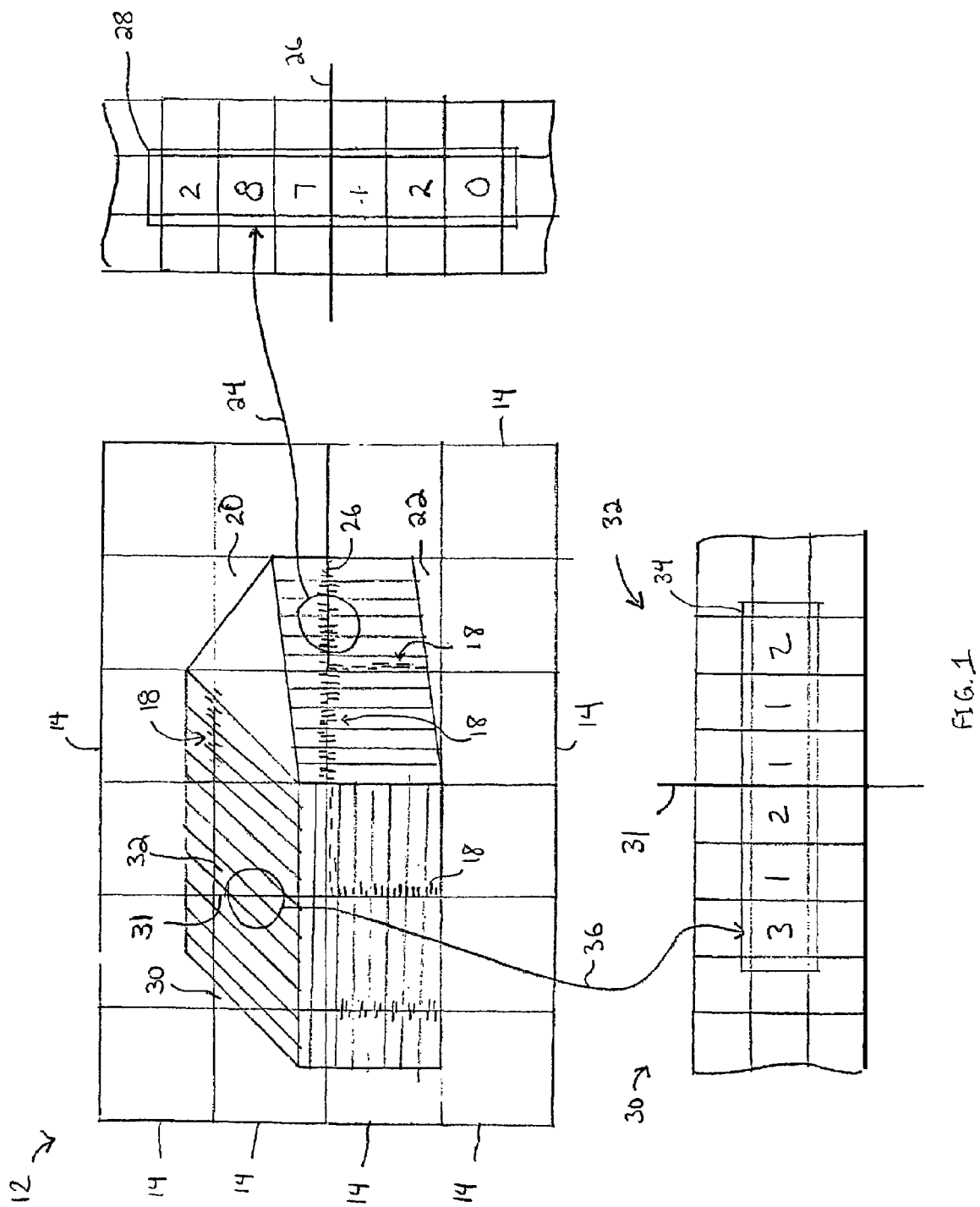
FIG. 1 is a diagram showing how deblock filtering is selectively skipped according to similarities between adjacent image blocks.

FIG. 1 shows an image 12 that selectively filters block artifacts according to similarities between image blocks. The image 12 includes multiple image blocks 14 that are each individually encoded before being stored, transmitted, etc. The borders between some of the blocks 14 include blocking artifacts 18. Blocking artifacts are any image discontinuities between blocks 14 that may be created by the encoding process. A low pass filter is used to reduce the blocking artifacts that exist at the borders of adjacent image blocks.

For example, blocking artifacts 24 exist between blocks 20 and 22. A low pass filter is used at the border 26 between blocks 20 and 22 to remove or reduce the blocking artifacts 24. The low pass filter in one example selects a group of pixels 28 from both sides of the border 26. An average pixel value is derived from the group of pixels 28. Then each individual pixel is compared to the average pixel value. Any pixels in group 28 outside of a predetermined range of the average pixel value is then replaced with the average pixel value.

As described above, if there are little or no blocking artifacts 24 between the adjacent pixels, then the group of pixels 28 may be needlessly filtered causing blurring in the image and wasting processing resources. A skip mode filtering scheme uses the motion estimation and compensation information for adjacent image blocks. If the motion estimation and compensation information is similar, deblock filtering is skipped. This not only avoids unnecessary image blurring but also significantly reduces the required number of filtering operations.

For example, it is determined during the encoding process that adjacent image blocks 30 and 32 have similar coding parameters. Accordingly, deblock filtering is skipped for the groups of pixels 34 that extend across the border 31 between adjacent blocks 30 and 32. Skip mode filtering can be used for any horizontal or vertical boundary between any adjacent blocks in image 12.

Figure 2:
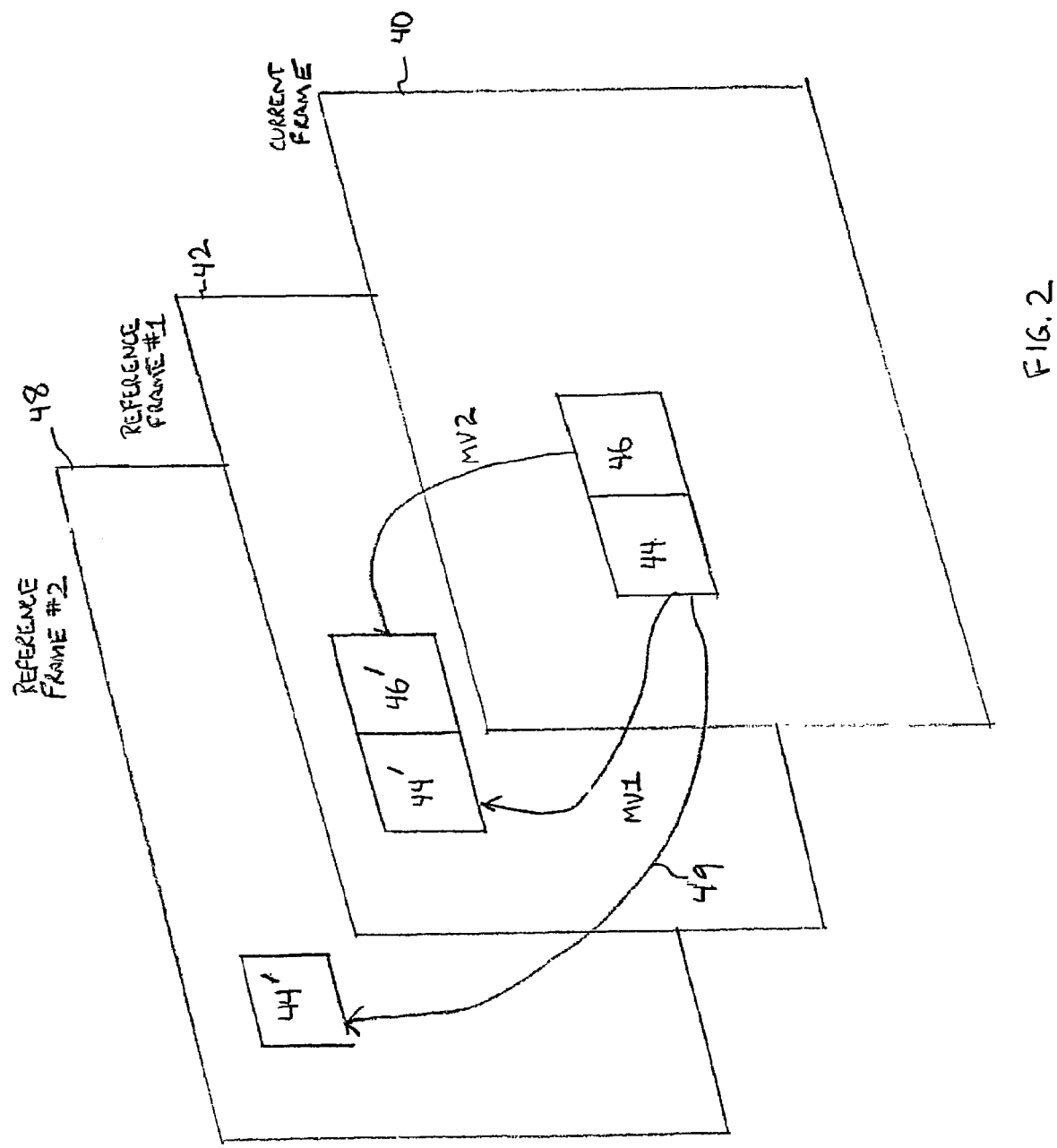
FIG. 2 is a diagram showing two adjacent image blocks having similar motion vectors.

FIG. 2 shows reference frames 42 and 48 and a current frame 40 that is currently being encoded or decoded. Coding parameters for blocks 44 and 46 are compared to determine whether deblock filtering should be skipped between the two adjacent blocks 44 and 46. One encoding parameter that is compared is the Motion Vectors (MV) for the blocks 44 and 46.

The motion vector MV1 points from block 44 in current image frame 40 to an associated block 44' in the reference image 42. The motion vector MV2 points from block 46 in current image frame 40 to an associated block 46' in reference frame 42. Skip mode filtering checks to see if the motion vectors MV1 and MV2 point to adjacent blocks in the same reference frame 42. If the motion vectors point to adjacent blocks in the reference frame (MV1=MV2), then deblock filtering is skipped. This motion vector information may be used along with other coding information to decide whether to skip deblock filtering between the two image blocks 44 and 46.

More than one reference frame may be used during the encoding and decoding process. For example, there may be another reference frame 48. The adjacent blocks 44 and 46 may have motion vectors pointing to different reference frames. In one embodiment, the decision to skip deblock filtering depends on whether the motion vectors for the two adjacent blocks point to the same reference frame. For example, image block 44 may have a motion vector 49 pointing to reference frame 48 and image block 46 may have the motion vector MV2 pointing to reference frame 42. Deblock filtering is not skipped in this example because the motion vectors 49 and MV2 point to different reference frames.

Figure 3:
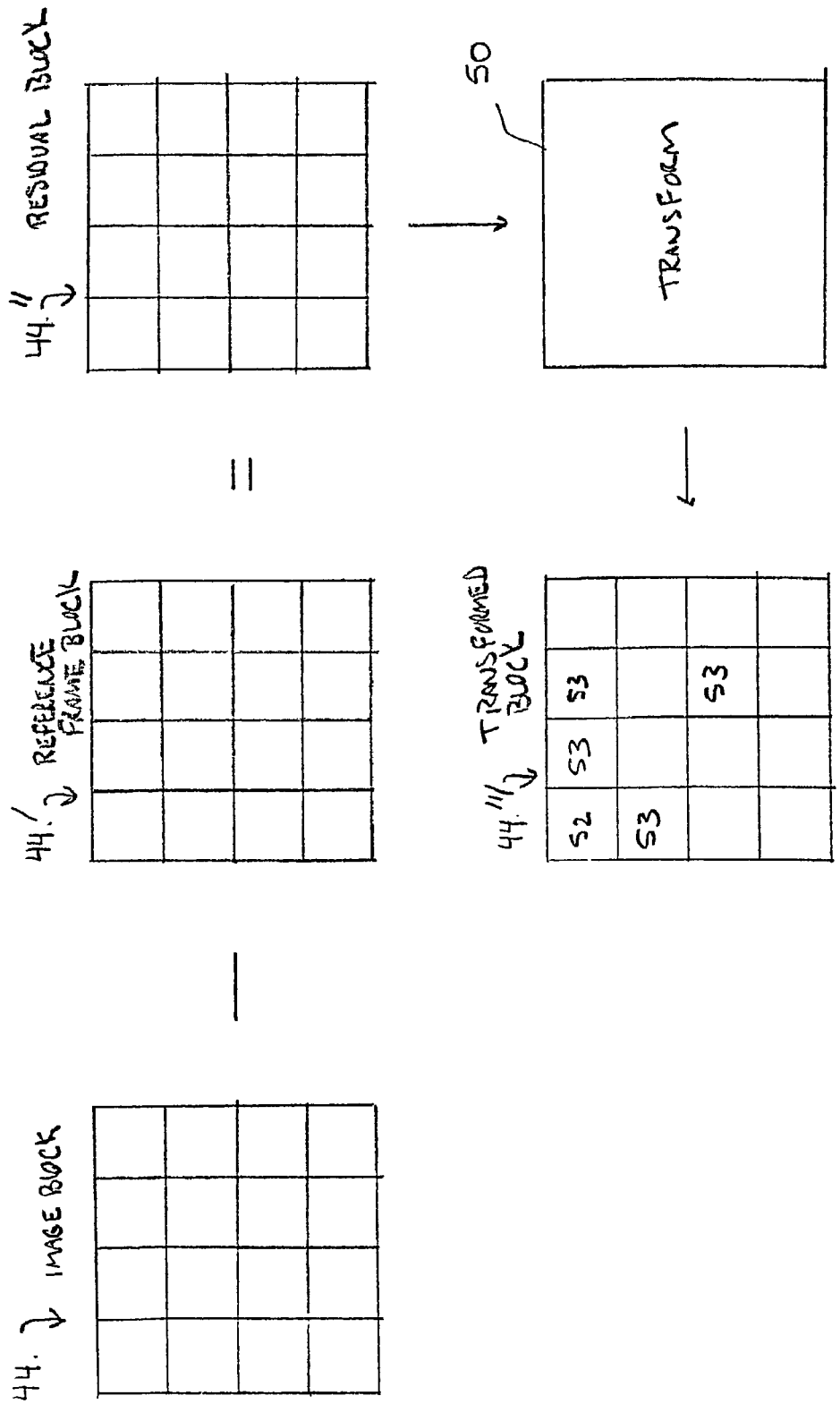
FIG. 3 is a diagram showing how transform coefficients are identified for one of the image blocks.

FIG. 3 shows another coding parameter that may be used to decide whether or not to skip deblock filtering. The image block 44 from image frame 40 is compared with reference block 44' from the reference frame 42 pointed to by the motion vector MV1 as previously shown in FIG. 2. A residual block 44" is output from the comparison between image block 44 and reference block 44'. A transform 50 is performed on the residual block 44" creating a transformed block 44'" of transform coefficients. In one example, the transform 50 is a Discrete Cosine Transform. The transformed block 44'" includes a D.C. component 52 and A.C. components 53.

The D.C. component 52 refers to a lowest frequency transform coefficient in image block 44. For example, the coefficient that represents the average energy in the image block 44. The A.C. components 53 refer to the transform coefficients that represent the higher frequency components in the image block 44. For example, the transform coefficients that represent the large energy differences between pixels in the image block 44.

Figure 4:
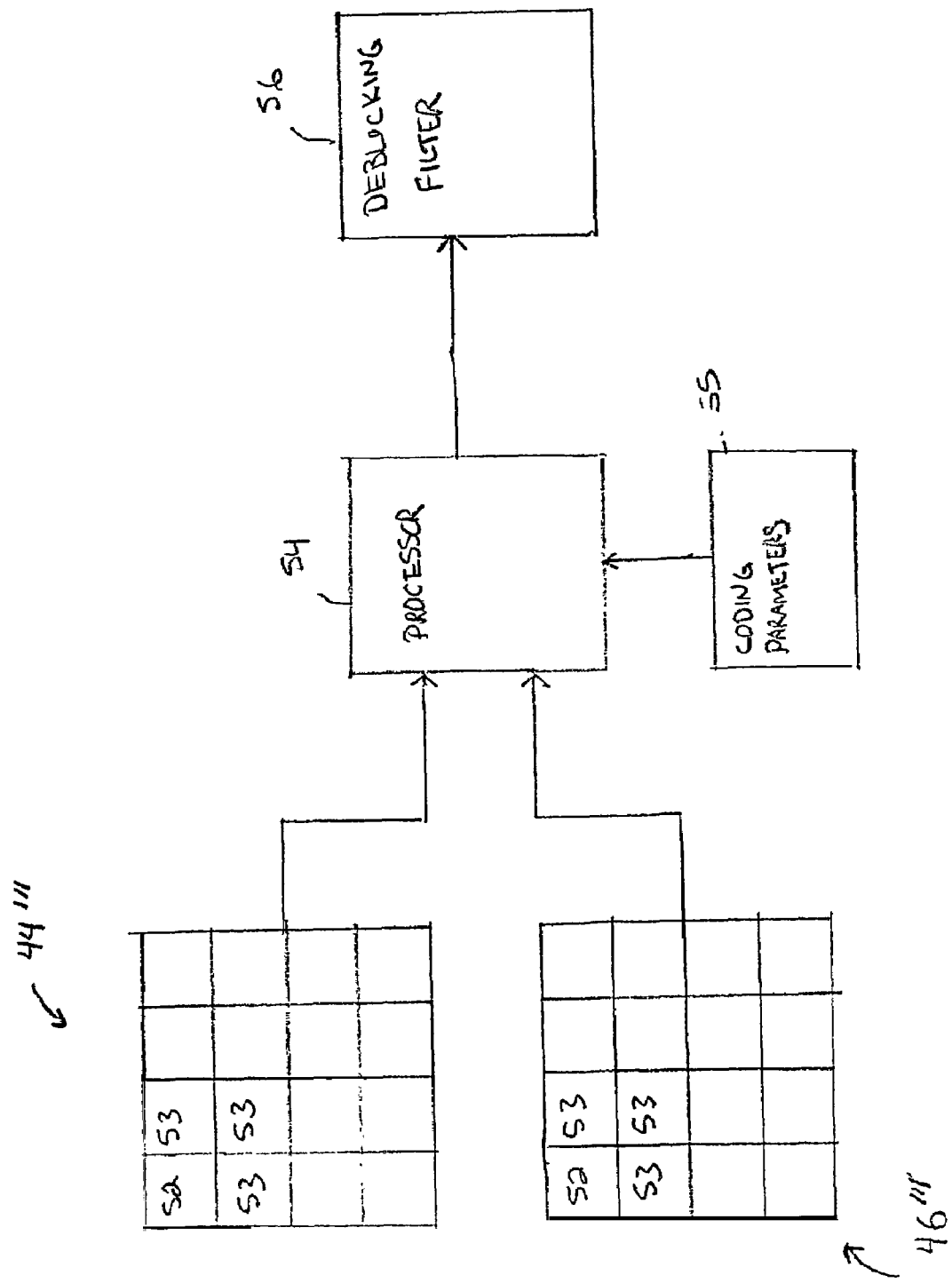
FIG. 4 is a diagram showing how residual transform coefficients are compared between two adjacent image blocks.

FIG. 4 shows the transformed residual blocks 44'" and 46'". The D.C. components 52 from the two transformed blocks 44'" and 46'" are compared in processor 54. If the D.C. components are the same or within some range of each other, the processor 54 notifies a deblock filter operation 56 to skip deblock filtering between the border of the two adjacent blocks 44 and 46. If the D.C. components 52 are not similar, then no skip notification is initiated and the border between blocks 44 and 46 is deblock filtered.

In one embodiment, skip mode filtering is incorporated into the Telecommunications Sector of the International Telecommunication Union (ITU-T) proposed H.26L encoding scheme. The H.26L scheme only uses 4×4 integer Discrete Cosine Transform (DCT) blocks. Here, only the D.C. component of the two adjacent blocks may be checked. However some limited low frequency A.C. coefficients could also be checked when the image blocks are bigger sizes, such as 8×8 or 16×16 blocks. For example, the upper D.C. component 52 and the three lower frequency A.C. transform coefficients 53 for block 44'" may be compared with the upper D.C. component 52 and three lower frequency A.C. transform coefficients 53 for block 46'". Different combinations of D.C. and/or low frequency A.C. transform coefficients can be used to identify the relative similarity between the two adjacent blocks 44 and 46.

The processor 54 can also receive other coding parameters 55 that are generated during the coding process. These coding parameters include the motion vectors and reference frame information for the adjacent blocks 44 and 46 as described above. The processor 54 uses all of these coding parameters to determine whether or not to skip deblock filtering between adjacent image blocks 44 and 46. Other encoding and transform functions performed on the image may be carried out in the same processor 54 or in a different processing circuit. In the case where all or most of the coding is done in the same processor, the skip mode is simply enabled by setting a skip parameter in the filtering routine.

Figure 5:
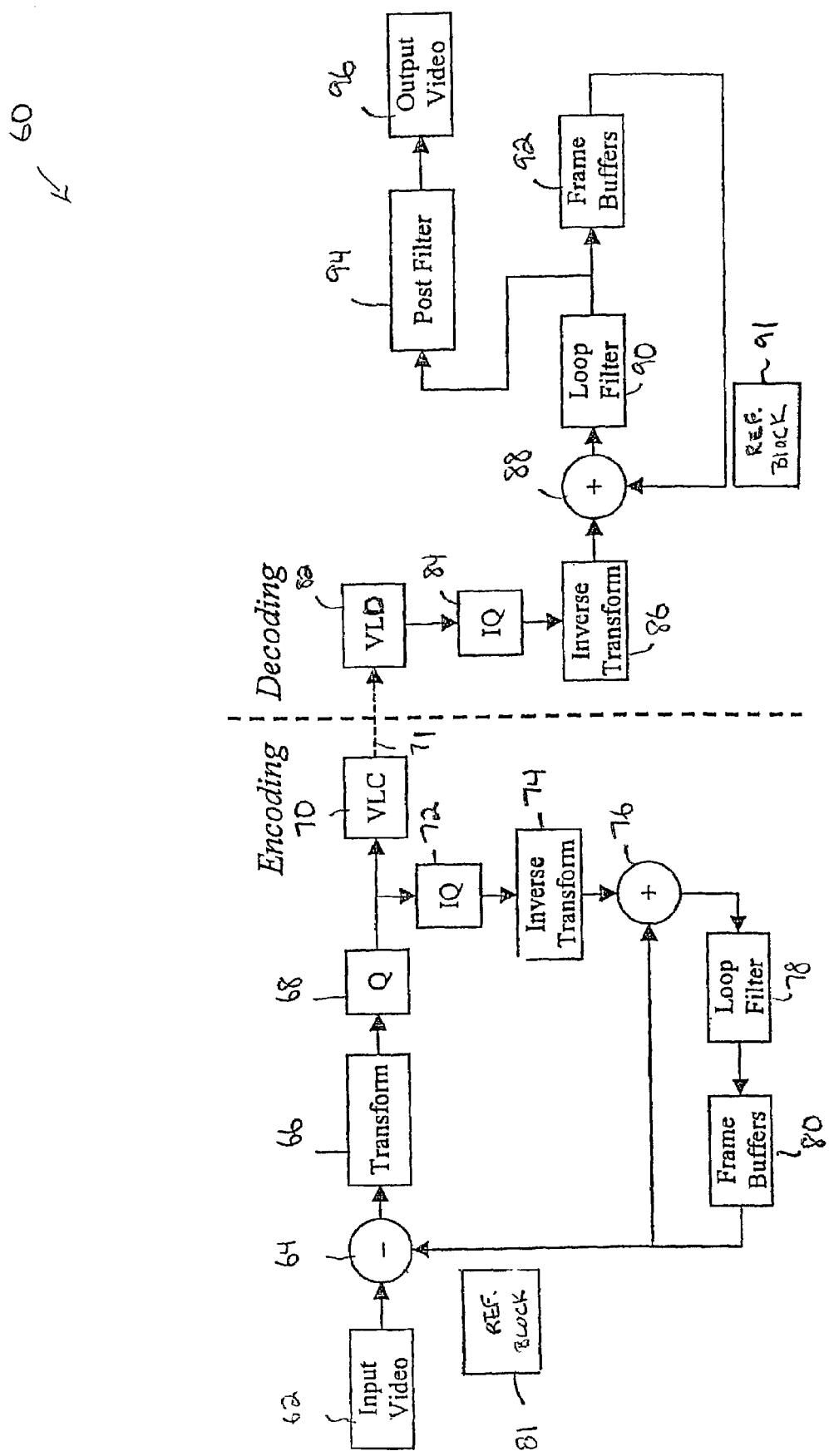
FIG. 5 is a block diagram showing how the video image is encoded and decoded.

FIG. 5 shows how skip mode filtering is used in a block-based motion-compensated Coder-Decoder (Codec) 60. The codec 60 is used for inter-frame coding. An input video block from the current frame is fed from box 62 into a comparator 64. The output of a frame buffering box 80 generates a reference block 81 according to the estimated motion vector (and possible reference frame number). The difference between the input video block and the reference block 81 is transformed in box 66 and then quantized in box 68. The quantized transform block is encoded by a Variable Length Coder (VLC) in box 70 and then transmitted, stored, etc.

The encoding section of the codec 60 reconstructs the transformed and quantized image by first Inverse Quantizing (IQ) the transformed image in box 72. The inverse quantized image is then inverse transformed in box 74 to generate a reconstructed residual image. This reconstructed residual block is then added in box 76 to the reference block 81 to generate a reconstructed image block. Generally the reconstructed image is loop filtered in box 78 to reduce blocking artifacts caused by the quantization and transform process. The filtered image is then buffered in box 80 to form reference frames. The frame buffering in box 80 uses the reconstructed reference frames for motion estimation and compensation. The reference block 81 is compared to the input video block in comparator 64. An encoded image is output at node 71 from the encoding section and is then either stored or transmitted.

In a decoder portion of the codec 60, a variable length decoder (VLD) decodes the encoded image in box 82. The decoded image is inverse quantized in box 84 and inverse transformed in box 86. The reconstructed residual image from box 86 is added in the summing box 88 to the reference block 91 before being loop filtered in box 90 to reduce blocking artifacts and buffered in box 92 as reference frames. The reference block 91 is generated from box 92 according to the received motion vector information. The loop filtered output from box 90 can optionally be post filtered in box 94 to further reduce image artifacts before being displayed as a video image in box 96. The skip mode filtering scheme can be performed in any combination of the filtering functions in boxes 78, 90 and 94.

The motion estimation and compensation information available during video coding are used to determine when to skip deblock filtering in boxes 78, 90 and/or 94. Since these coding parameters are already generated during the encoding and decoding process, there are no additional coding parameters that have to be generated or transmitted specially for skip mode filtering.

Figure 6:
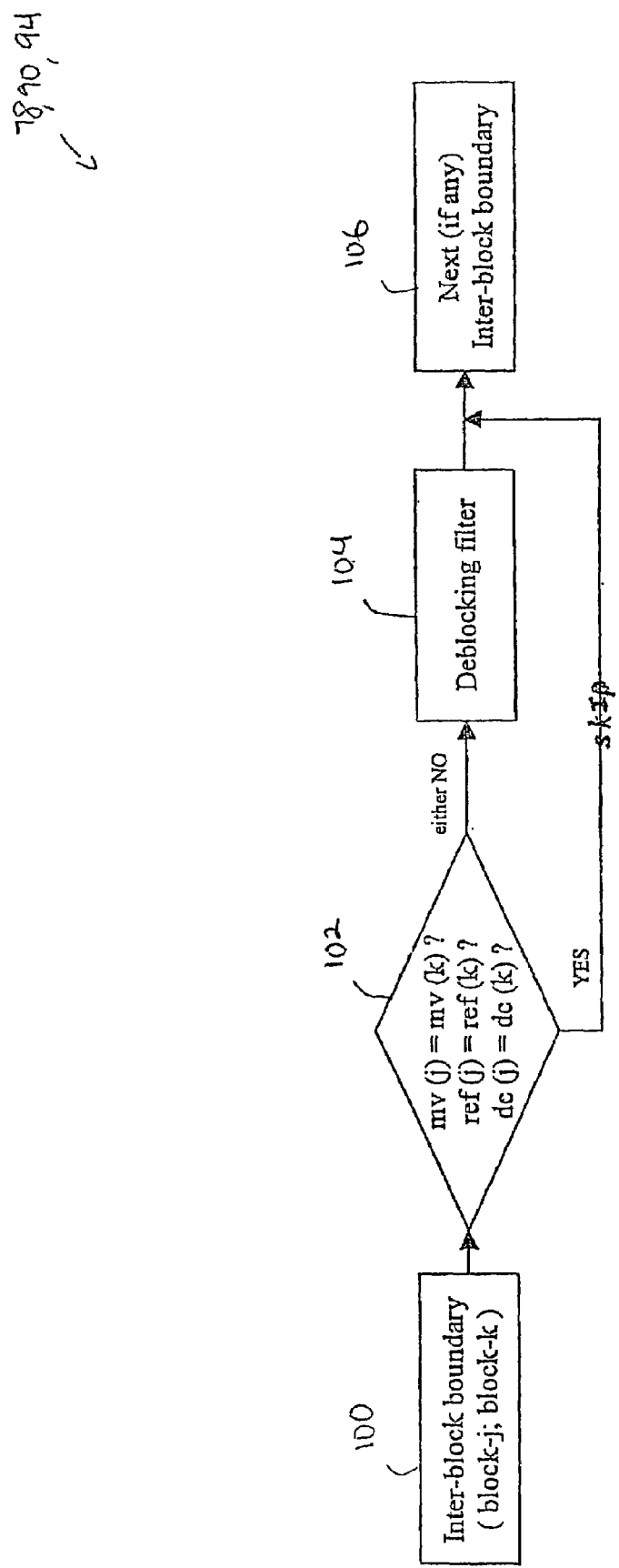
FIG. 6 is a block diagram showing how deblock filtering is selectively skipped in a codec.

FIG. 6 shows is further detail how skip mode filtering is used in the filters 78, 90, and/or 94 in the encoder and decoder in FIG. 5. The interblock boundary between any two adjacent blocks "j" and "k" is first identified in box 100. The two blocks may be horizontally or vertically adjacent in the image frame. Decision box 102 compares the motion vector mv(j) for block j with the motion vector mv(k) for block k. It is first determined whether the two adjacent blocks j and k have the same motion vector pointing to the same reference frame. In other words, the motion vectors for the adjacent blocks point to adjacent blocks (mv(j)=mv(k)) in the same reference frame (ref(j)=ref(k)).

It is then determined whether the residual coefficients for the two adjacent blocks are similar. If there is no significant difference between the image residuals of the adjacent blocks, for example, the two blocks j and k have the same of similar D.C. component (dc(j)=dc(k)), then the deblock filtering process in box 104 is skipped. Skip mode filtering then moves to the next interblock boundary in box 106 and conducts the next comparison in decision box 102. Skip mode filtering can be performed for both horizontally adjacent blocks and vertically adjacent blocks.

In one embodiment, only the reference frame and motion vector information for the adjacent image blocks are used to determine block skipping. In another embodiment, only the D.C. and/or A.C. residual coefficients are used to determine block skipping. In another embodiment, the motion vector, reference frame and residual coefficients are all used to determine block skipping.

The skip mode filtering scheme can be applied to spatially sub-sampled chrominance channels. For example in a case with 4:2:0 color format sequences, skip mode filtering for block boundaries may only rely on the equality of motion vectors and D.C. components for the luminance component of the image. If the motion vectors and the D.C. components are the same, deblock filtering is skipped for both the luminance and chrominance components of the adjacent image blocks. In another embodiment, the motion vectors and the D.C. components are considered separately for each luminance and chrominance component of the adjacent blocks. In this case, a luminance or chrominance component for adjacent blocks may be deblock filtered while the other luminance or chrominance components for the same adjacent blocks are not deblock filtered.

FIG. 7 includes a table 110 showing the results of skip mode filtering using a ITU-TH.26L Testing Model-Long TML5.0. Table 110 compares the results of the TML filtering standard with skip mode filtering as described above. Encoding results using skip mode filtering are shown in table 110 under the heading SLA.

There were four images that were tested, Akiyo_cif for 300 frames at 30 Frames Per Second (fps), Foreman_cif for 300 frames at 30 fps, Foreman_qcif for 100 frames at 10 fps, and Tempete_cif for 260 frames at 30 fps. Quantization Parameters (QP) of 25 and 30 were used. The results show no significant visual quality degradation with the skip mode filtering. The Picture Signal to Noise Ratio (PSNR) for the images stays approximately the same for the luminance Y and chrominance U and V channels. However, skip mode filtering provides time savings of 40-70 percent.

Skip mode filtering can be used with any system that encodes or decodes multiple image frames. For example, DVD players, video recorders, or any system that transmits image data over a communications channel, such as over television channels or over the Internet.

The skip mode filtering described above can be implemented with dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Figure 8:
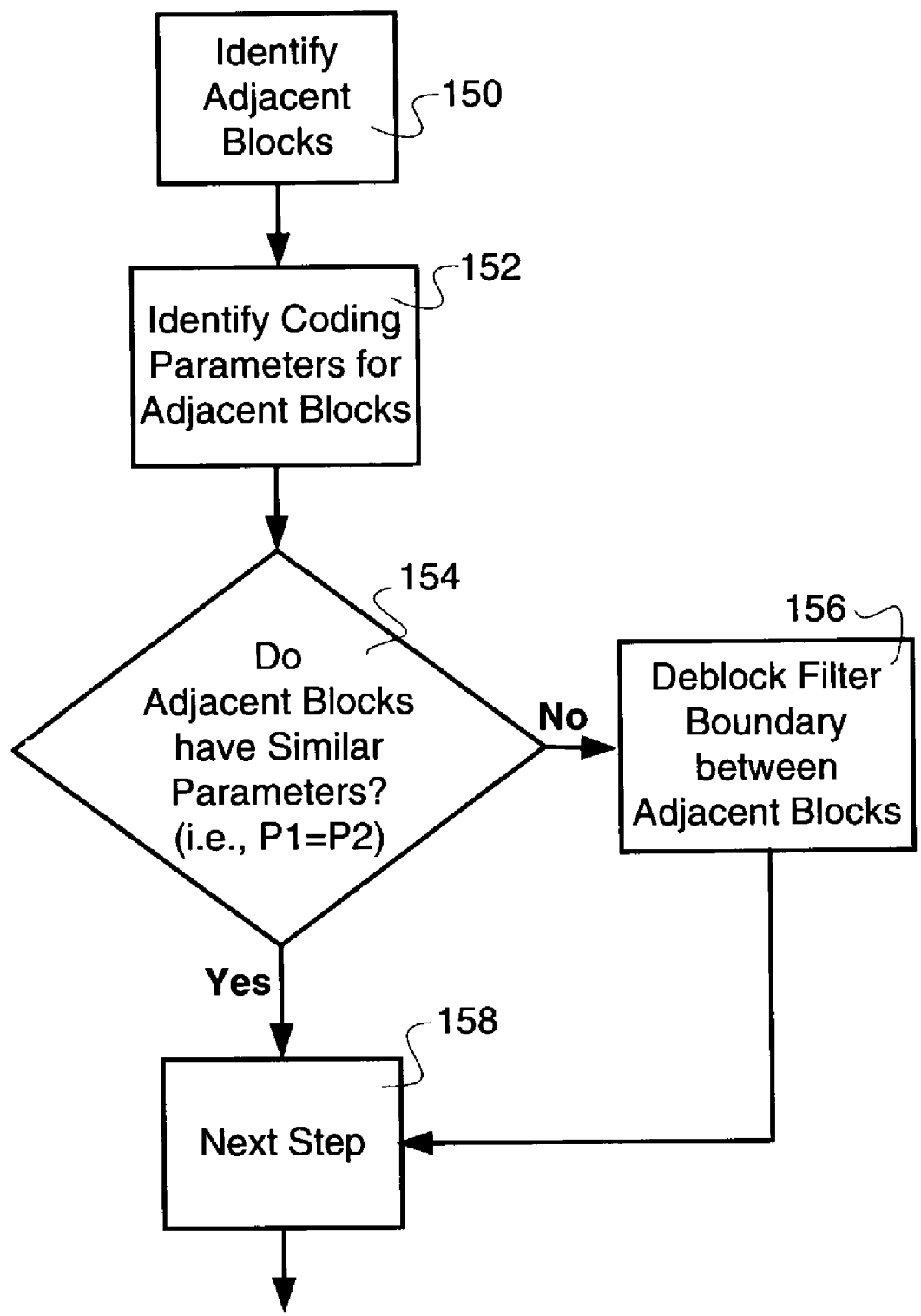
FIG. 8 is a flow chart describing the steps of an embodiment of the present invention in which deblock filtering between adjacent blocks is dependent on similarity of coding parameters in adjacent blocks.

Some embodiments of the present invention may be described with reference to FIG. 8. In these systems and methods, adjacent blocks 150 in a video frame are identified and coding parameters for these adjacent blocks are identified. The coding parameters for the adjacent blocks are then compared to determine their similarity 154. When the coding parameters are not similar, a deblock filter 156 is applied along the boundary between the adjacent blocks. When the coding parameters are similar, deblock filtering is skipped and the process proceeds to the next step 158. Likewise, when deblock filtering is performed, the process proceeds to the next step 158 after filtering.

Figure 9:
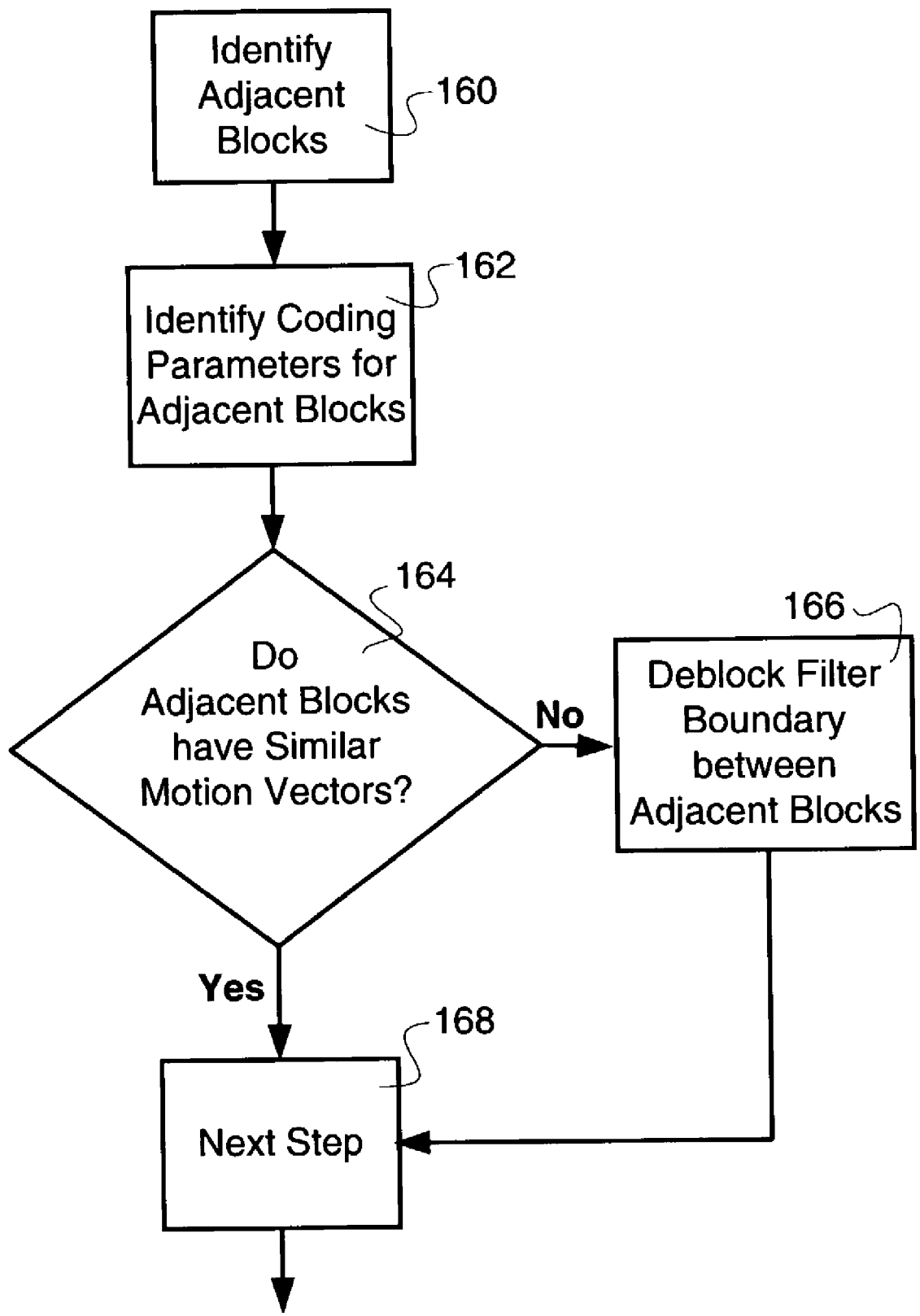
FIG. 9 is a flow chart describing the steps of an embodiment of the present invention in which deblock filtering between adjacent blocks is dependent on adjacent blocks having similar motion vectors.

In some embodiments of the present invention, as shown in FIG. 9, the coding parameters are motion vectors. In these embodiments, adjacent blocks in a video frame are identified 160 and coding parameters 162 comprising motion vectors are identified. These motion vectors are compared to determine their similarity 164. When the motion vectors are not similar, deblock filtering may be performed 166 between the adjacent blocks and the process may proceed to its next step 168. When the motion vectors are similar, deblock filtering is skipped and the next step 168 is accomplished directly.

Figure 10:
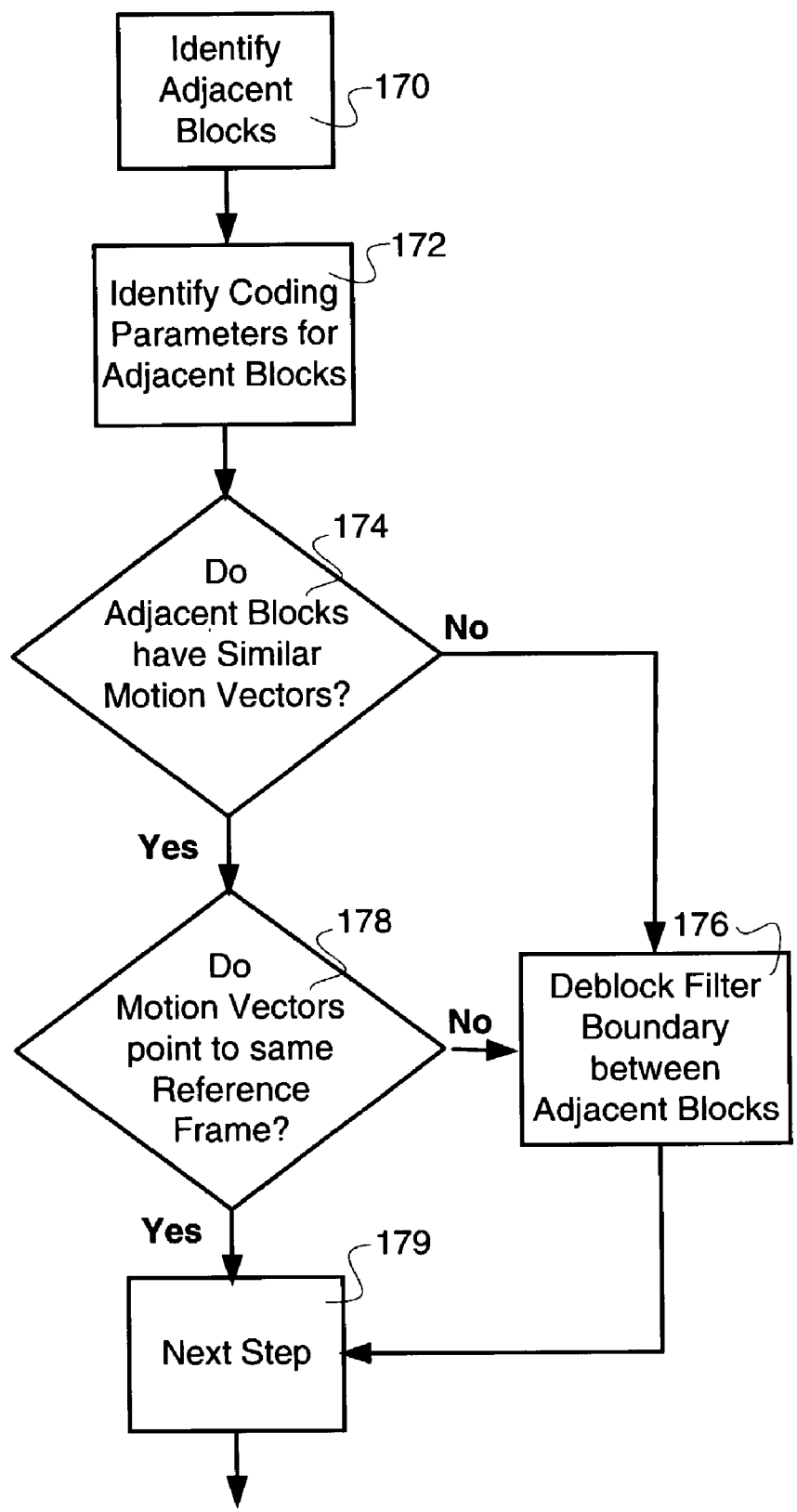
FIG. 10 is a flow chart describing the steps of an embodiment of the present invention in which deblock filtering between adjacent blocks is dependent on adjacent blocks having similar motion vectors that point to the same reference frame.

Other embodiments of the present invention, as shown in FIG. 10, may use multiple coding parameters to determine whether to skip filtering. In these embodiments, adjacent blocks are identified 170 and coding parameters 172 are determined for the adjacent blocks. These coding parameters may comprise motion vector attributes including the target frame of the motion vectors. When motion vectors of adjacent blocks are not similar 174, deblock filtering may be performed 176 between the adjacent blocks. When motion vectors are similar 174, other parameters may be used to further qualify the filtering process. In this example, the motion vectors may be compared to determine whether they point to the same reference frame 178. If the vectors do not point to the same reference frame, deblock filtering may be performed between the blocks 176. If the vectors point to the same reference frame, filtering may be skipped and the process may proceed to the next step 179.

Figure 11:
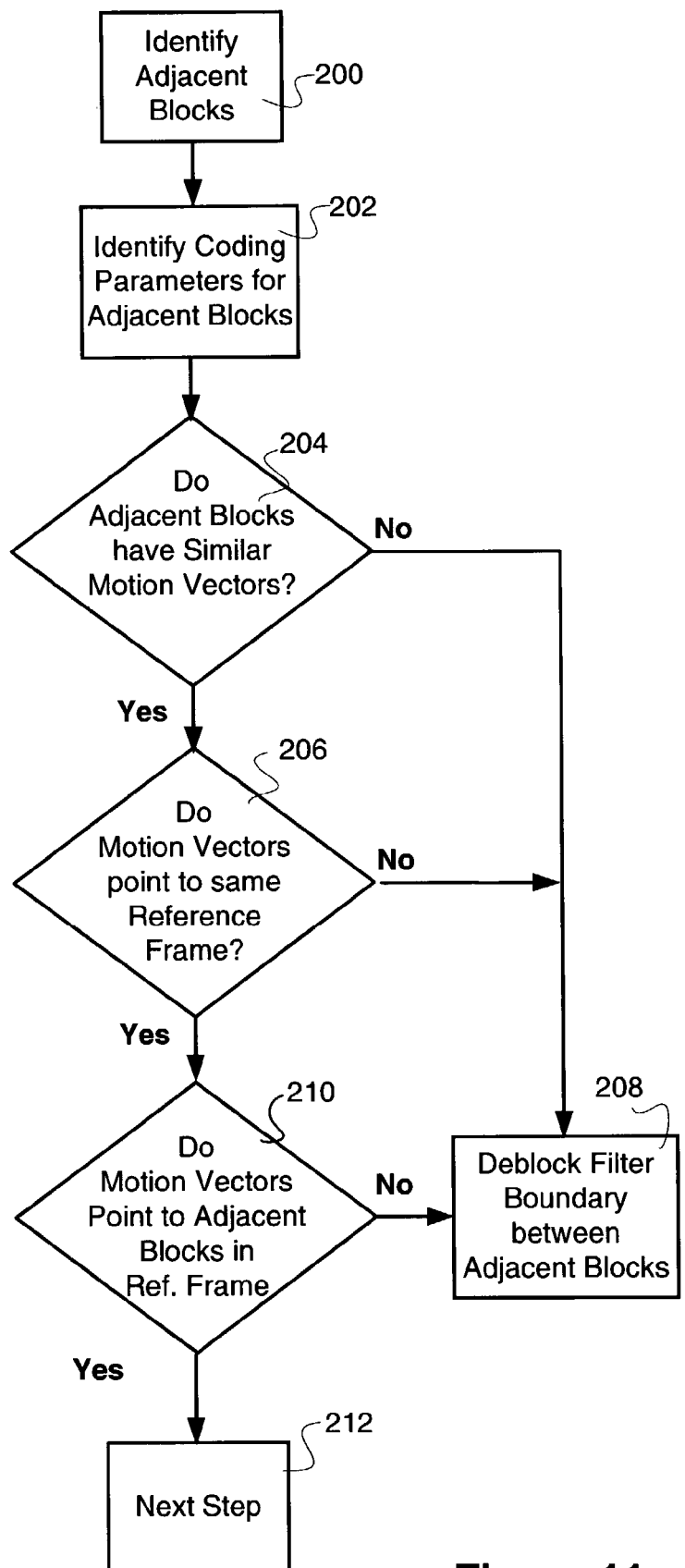
FIG. 11 is a flow chart describing the steps of an embodiment of the present invention in which deblock filtering between adjacent blocks is dependent on adjacent blocks having similar motion vectors that point to adjacent reference blocks in a single reference frame.

Further motion vector parameters may be used to determine filtering. In embodiments illustrated in FIG. 11, the location of the blocks to which vectors point is a parameter that may be used to determine filtering options. In these embodiments, adjacent blocks are identified 200 and coding parameters are identified for the adjacent blocks 202. Motion vectors are then compared to determine their similarity 204. If the vectors are not similar, deblock filtering may proceed 208. If motion vectors are similar, another comparison may be made to determine whether the motion vectors of the adjacent blocks point to the same reference frame. If the vectors don't point to the same frame, deblock filtering may proceed 208. If the vectors do point to the same reference frame, the blocks to which the vectors point may be compared 210. When motion vectors do not point to adjacent blocks in the same reference frame, deblock filtering may proceed 208. When the vectors point to adjacent blocks in the same reference frame, deblock filtering may be skipped and a next step 212 may be executed. In this manner, adjacent blocks which reference adjacent blocks in a reference frame and which are not likely to have significant artifacts therebetween are not deblock filtered. This deblock filter skipping avoids any blurring and image degradation caused by the filtering process. Processing time is also conserved as unnecessary filtering is avoided. Image quality is thereby improved and fewer calculations are required in the process. It should be noted that various combinations of these motion vector parameters may be used to determine filter skipping. These myriad combinations are not specifically described in detail, but are thought to be within the grasp of one skilled in the art and are intended to fall within the scope of the appended claims.

Further embodiments of the present invention may utilize transform coefficients to determine whether deblock filtering should occur. In reference to FIG. 12, adjacent blocks 180 in a frame are identified and coding parameters are identified for the adjacent blocks 182. These coding parameters may comprise motion vector parameters as well as transform coefficients.

Motion vectors are then compared 184 to determine similarity. If the motion vectors are not similar, deblock filtering may be performed 186. If the motion vectors are similar, the motion vector data is analyzed to determine whether the motion vectors point to the same reference frame. If the motion vectors do not point to the same reference frame 185, filtering may proceed 186.

If the motion vectors point to the same reference frame 185, transform coefficients may be compared to further qualify filtering processes. In this example, DC transform coefficients obtained through Discrete Cosine Transform (DCT) methods or other methods may be compared for the adjacent blocks. If the DC transform coefficients are not similar 187, deblock filtering may be performed 186. If the DC transform coefficients are similar, filtering may be skipped and the methods and systems may proceed to the next step 188.

Figure 12:
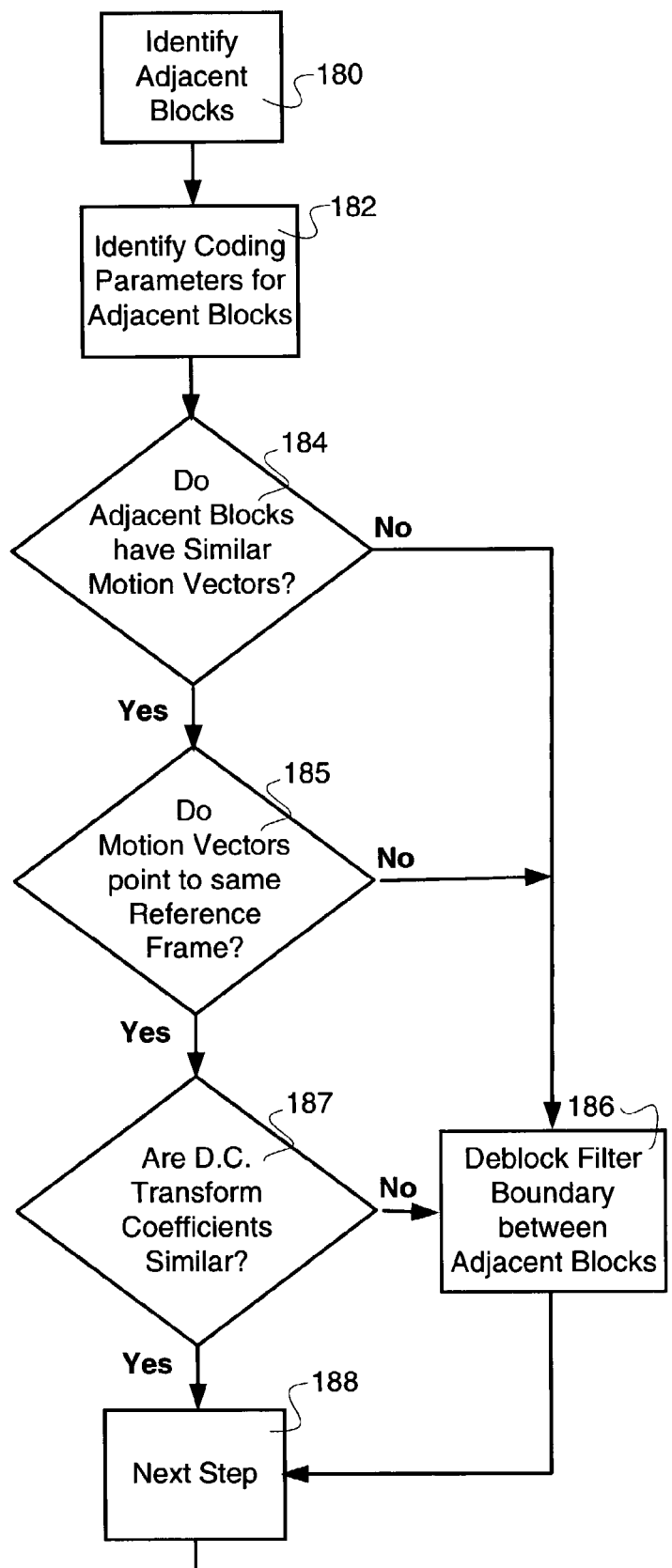
FIG. 12 is a flow chart describing the steps of an embodiment of the present invention in which deblock filtering between adjacent blocks is dependent on adjacent blocks having parameters comprising similar D.C. transform coefficients.
Figure 13:
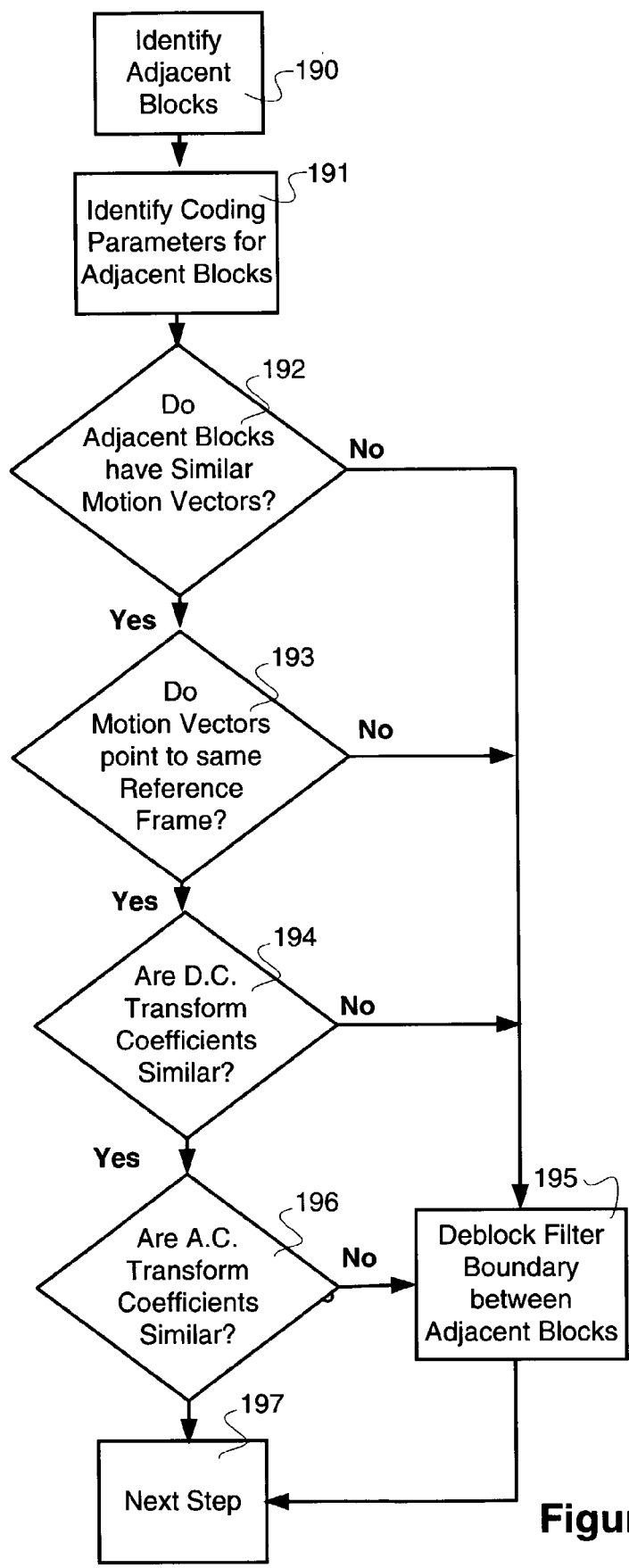
FIG. 13 is a flow chart describing the steps of an embodiment of the present invention in which deblock filtering between adjacent blocks is dependent on adjacent blocks having parameters comprising similar A.C. transform coefficients.

Still other embodiments of the present invention may utilize AC transform coefficients to determine filtering options. In reference to FIG. 13, embodiments similar to those described in relation to FIG. 12 are illustrated with the additional steps of evaluating AC transform coefficients. In these embodiments, blocks 190 and their coding parameters 191 are identified. Similarities in motion vectors 192, motion vector target frames 193 and DC transform coefficients are also compared 194. When similarities in these parameters exist, AC transform coefficients are compared 196 and, if they are similar, deblock filtering is skipped and the next step in the process is executed 197. If the AC coefficients are not similar, filtering is performed between the adjacent blocks and the process proceeds on to the next step 197.

AC transform coefficients are more likely to have significance in larger blocks, but can be used in methods utilizing smaller blocks such as 4×4 blocks.

In some embodiments of the present invention, an image may be separated into various luminance and chrominance channels depending on the format of the image and the color space utilized. In the following examples, a YUV color space is described, however, many other formats and color spaces may be used in these embodiments. CieLAB, YcrCb and other spaces may be used. In alternative embodiments color spaces such as RGB may be used.

Figure 14:
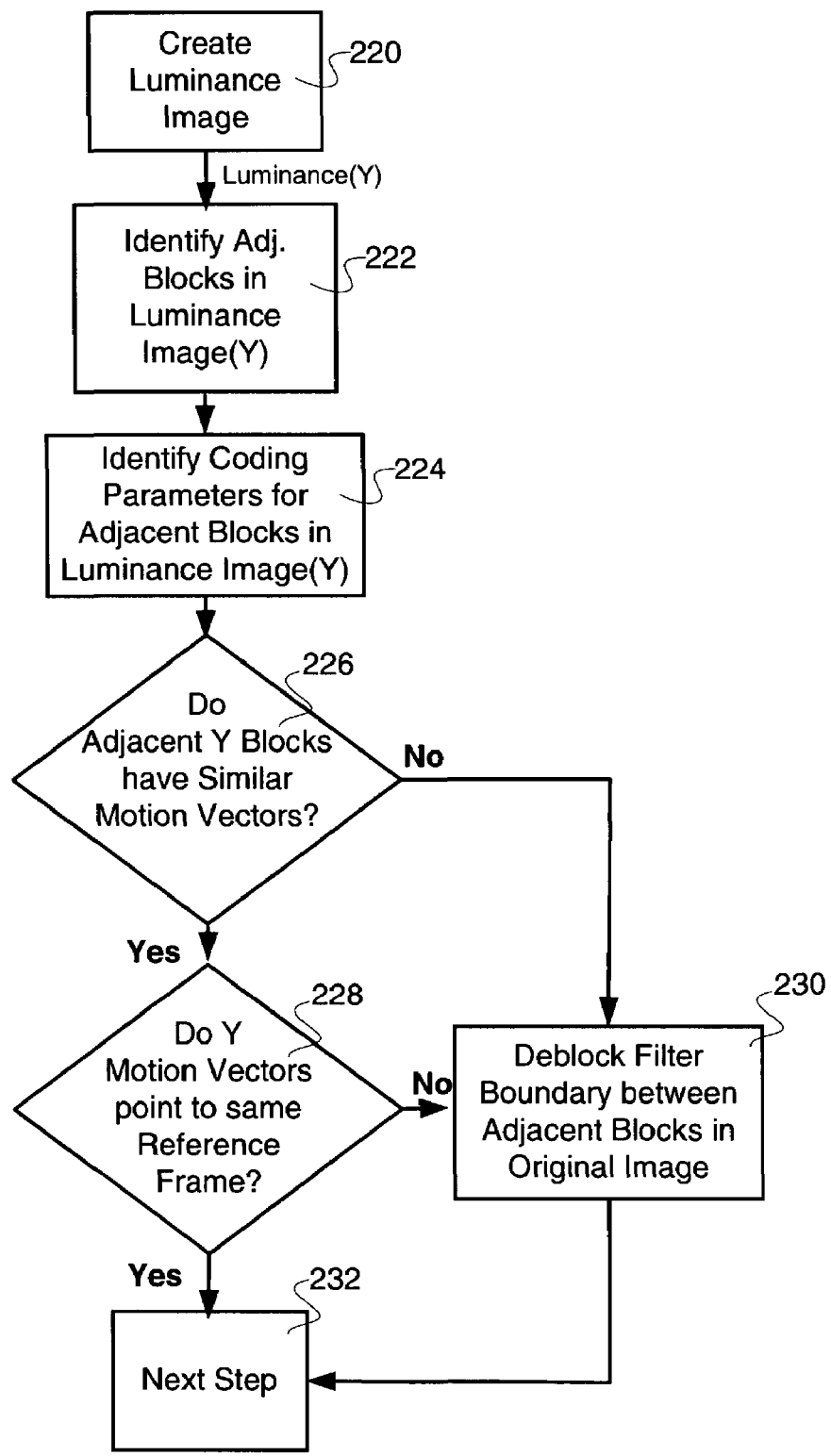
FIG. 14 is a flow chart describing the steps of an embodiment of the present invention in which deblock filtering between adjacent blocks is dependent on adjacent blocks in a luminance image having parameters comprising similar motion vectors and similar motion vector targets in a reference frame.

Some embodiments of the present invention may be described in relation to FIG. 14. In these embodiments, luminance data is extracted from the image and a luminance image is created 220. Adjacent blocks are then identified in the luminance image 222 and coding parameters for the adjacent blocks are also identified 224. As in other embodiments, the motion vectors of the adjacent blocks are compared to determine similarities 226. When the motion vectors are not similar, deblock filtering is performed 230, when the vectors are similar further analysis is performed to determine whether the vectors point to the same reference frame 228. When the vectors point to different reference frames, deblock filtering is performed between the adjacent blocks 230 of the original image that correspond to the adjacent blocks in the luminance image. When the vectors point to the same frame, deblock filtering is skipped and the next step is executed without prior filtering 232. When filtering is performed, the next step is executed 232 after the filtering processes. Accordingly, analysis of data in the luminance channel is used to determine filtering processses in the original image, which contains both luminance and chrominance data.

Figure 15:
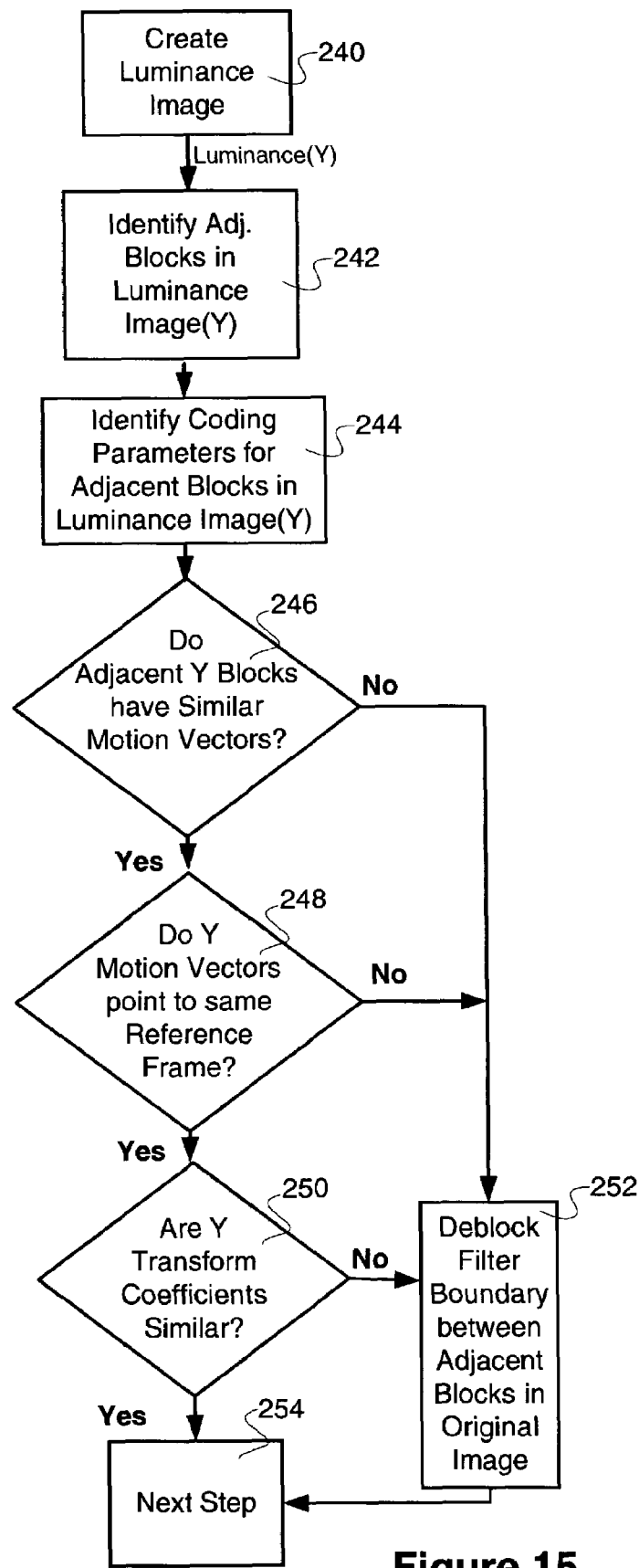
FIG. 15 is a flow chart describing the steps of an embodiment of the present invention in which deblock filtering between adjacent blocks is dependent on adjacent blocks in a luminance image having parameters comprising similar motion vectors, similar motion vector targets in a reference frame and similar transform coefficients.

In other related embodiments, illustrated in FIG. 15, a luminance image is created 240 and corresponding adjacent blocks are identified in the luminance and original image 242. Coding parameters are also identified for the luminance image blocks 244. Subsequently, motion vectors are compared to determine similarities 246. If significant similarities do not exist, filtering is performed between the adjacent blocks in the original image 252. If motion vectors are similar, the target frames of the motion vectors are compared to determine whether the vectors point to the same reference frame. If the vectors do not point to the same reference frame, filtering is performed. If the vectors point to the same reference frame, transform coefficients of the luminance (Y) image are compared. If Y transform coefficients are not similar, filtering is performed. If transform coefficients are similar, filtering is skipped and the next step 254 is executed. Likewise, the next step is executed 254 after any filtering operation.

Images may be further divided into component channels that generally correspond to luminance and chrominance channels. In some embodiments of the present invention, each channel may be filtered according to parameters unique to that channel.

Figure 16:
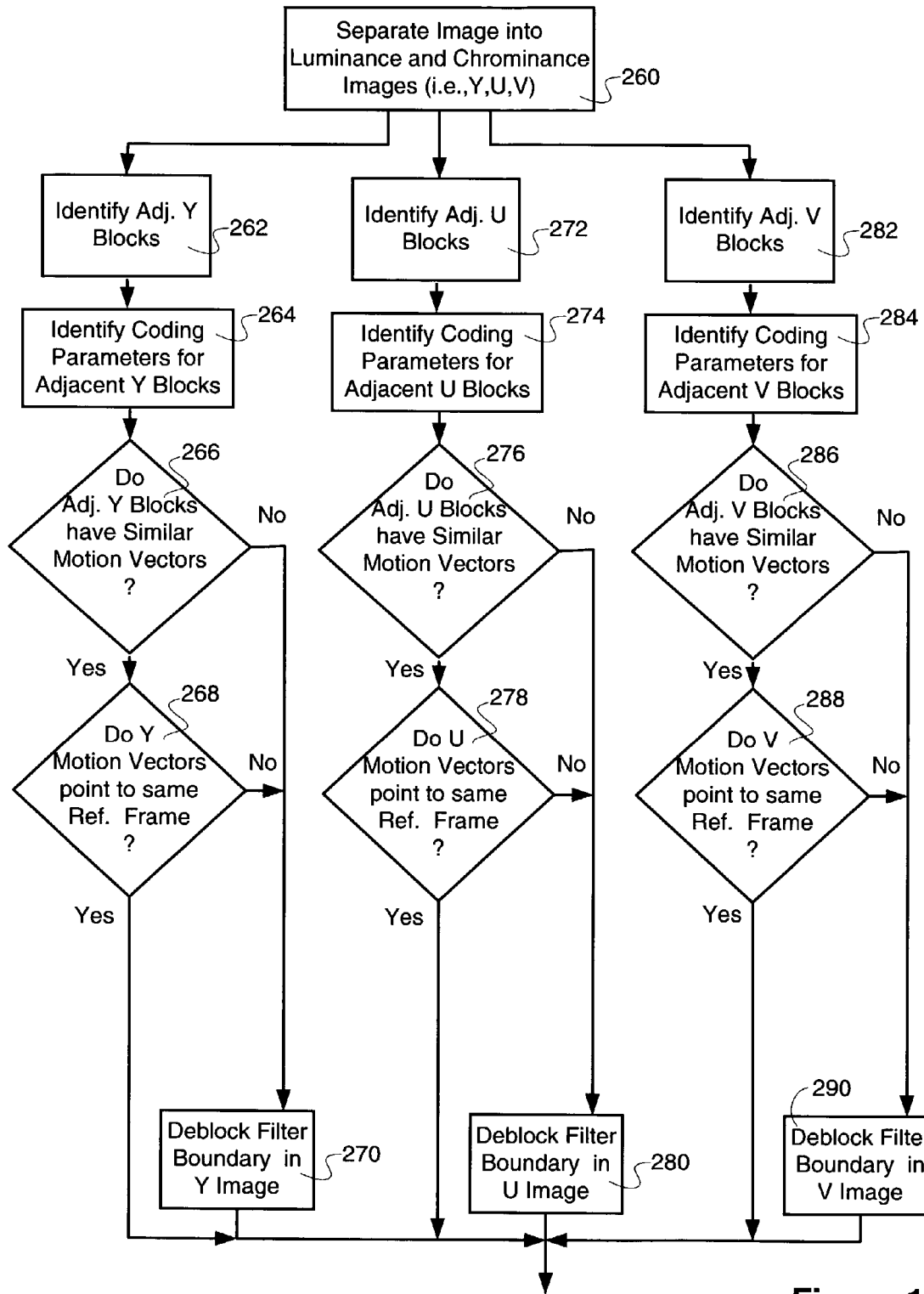
FIG. 16 is a flow chart describing the steps of an embodiment of the present invention in which an image is split into separate luminance and chrominance channels and deblock filtering between adjacent blocks in each luminance or chrominance image is dependent on adjacent blocks in a luminance image having parameters comprising similar motion vectors.

As an example, embodiments may be described with reference to FIG. 16, wherein an image is divided into separate luminance (Y) and multiple chrominance (U, V) channels 260. In these embodiments adjacent blocks are identified in images corresponding to each channel 262, 272, 282. Coding parameters, such as motion vectors data, are also identified for these blocks in each channel 264, 274, 284. These coding parameters may then be compared to determine similarities as in other embodiments. In these exemplary embodiments, motion vector similarities for channel-specific motion vectors may be used to determine filtering options in each channel. When the motion vectors for a channel image are not similar 266, 276, 286, filtering is performed in that specific channel between the adjacent blocks 270, 280, 290. If the motion vectors are similar, the target reference frames are compared 268, 278, 288. When the vectors for adjacent blocks in a channel point to the same reference frame, filtering is skipped. When the vectors point to different reference frames filtering is performed 270, 280, 290.

Figure 17:
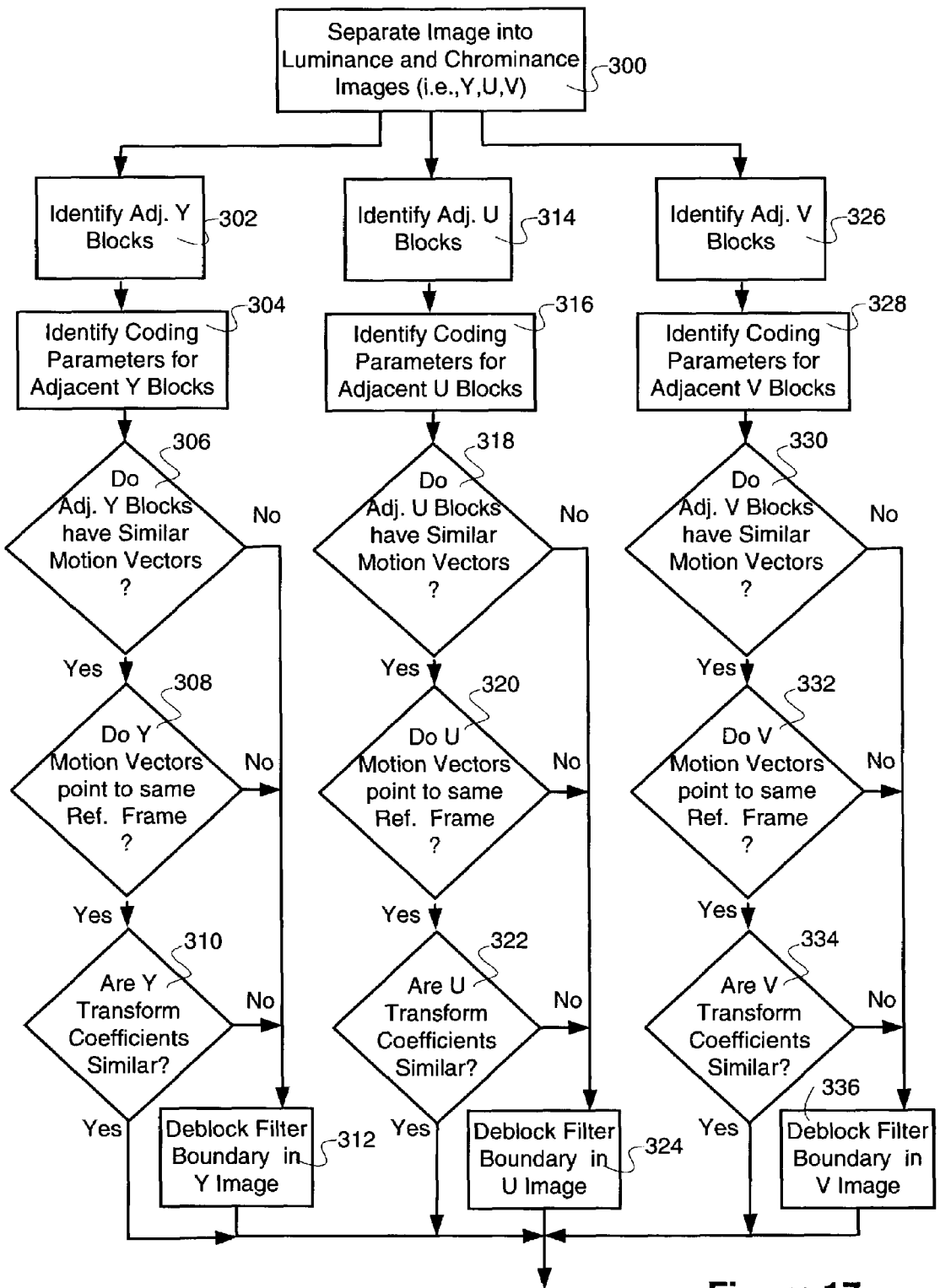
FIG. 17 is a flow chart describing the steps of an embodiment of the present invention in which an image is split into separate luminance and chrominance channels and deblock filtering between adjacent blocks in each luminance or chrominance image is dependent on adjacent blocks in a luminance image having parameters comprising similar motion vectors, similar motion vector targets in a reference frame and similar transform coefficients.

As in other embodiments, these channelized embodiments may utilize transform coefficient data to qualify filtering options. As shown in FIG. 17, the methods and systems described in relation to FIG. 16 may further compare channel transform coefficients 310, 322, 334. When the coefficients are not similar, filtering is performed 312, 324, 336. When the coefficients are similar, filtering is skipped.

It should be noted that various combinations of parameters may be employed in qualifying filtering operations in each channel. DC and AC transform coefficients may be utilized for these embodiments. Furthermore, various channels and combinations of channels may be used to determine filtering options and perform filtering. For example, both chrominance channels may be combined and analyzed together in some embodiments. Data and parameters from one channel may also be used to determine filtering options in another channel. For example, parameters taken from the U chrominance channel may be compared to determine filtering options in the V chrominance channel and vice versa.

Having described and illustrated the principles of the invention in various exemplary embodiments thereof, it should be apparent that the invention may be modified in arrangement and detail without departing from such principles. Claim is made to all modifications and variations coming within the spirit and scope of the following claims.

The invention claimed is:

1. A method for selective image filtering, said method comprising:
    identifying a first block in an image;
    identifying an adjacent block in said image, wherein said adjacent block shares a common interblock boundary with said first block, wherein said interblock boundary is located between boundary pixels in said first block and boundary pixels in said adjacent block that are immediately adjacent to said boundary pixels in said first block;
    identifying a coding parameter for said first block;
    identifying a coding parameter for said adjacent block; and
    selectively deblock filtering only within a portion of said first block that is proximate to said interblock boundary when said first block coding parameter and said adjacent block coding parameter are not similar.

2. A method according to claim 1 wherein said identified coding parameters comprise motion vectors.

3. A method according to claim 1 wherein said identified coding parameters comprise reference image frames.

4. A method according to claim 1 wherein said identified coding parameters comprise transform coefficients.

5. A method according to claim 1 wherein said identified coding parameters comprise D.C. components in the transform coefficients.

6. A method according to claim 1 wherein said identified coding parameters comprise A.C. components in the transform coefficients.

7. A method according to claim 1 wherein said identified coding parameters comprise at least one parameter taken from the group consisting of motion vector data, reference image frame data, reference image block data, D.C. component data in a transform coefficient and A.C. component data in a transform coefficient.

8. A method for selective filtering of individual block boundaries, said method comprising:
    selecting a target block in an image;
    identifying a first adjacent block that is immediately adjacent to said target block;
    identifying a second adjacent blocks that is immediately adjacent to said target block;
    identifying a first interblock boundary along a line between a first set of pixels in said target block and pixels in said first adjacent block that are immediately adjacent to said first set of pixels in said target block;
    identifying a second interblock boundary along a line between a second set of pixels in said target block and pixels in said second adjacent block that are immediately adjacent to said second set of pixels in said target block;
    identifying a target coding parameter for said target block;
    identifying a first coding parameter for said first adjacent block;
    identifying a second coding parameter for said second adjacent block;

filtering only within a first portion of said target block and said first adjacent block that is proximate to said first interblock boundary when said target coding parameter and said first coding parameter are substantially dissimilar; and filtering only within a second portion of said target block and said second adjacent block that is proximate to said second interblock boundary when said target coding parameter and said second coding parameter are substantially dissimilar.

9. A method according to claim 8 wherein said coding parameters comprise motion vectors and said substantial dissimilarity is achieved when said motion vectors point to different reference frames.

10. A method according to claim 8 wherein said coding parameters are transform coefficients.

11. A method according to claim 10 wherein said transform coefficients are D.C. coefficients.

12. A method according to claim 11 further comprising transform coefficients that are A.C. coefficients.

13. A method according to claim 10 wherein said coding parameters comprise motion vectors and transform coefficients.

14. A codec for at least one of encoding or decoding an image, said codec comprising:
a block identifier for identifying a target block, an adjacent block, and an interblock boundary along a line where pixels in said target block are immediately adjacent to pixels in said adjacent block;
a parameter identifier for identifying coding parameters that were previously used in an encoding process for said target block and said adjacent blocks;
a comparator for comparing said coding parameters; and
a filter selector for selective enablement of at least one filter to only within a portion of said target block and said adjacent block that is proximate to said interblock boundary, said selector operating in response to a comparison of the coding parameters; and
wherein said at least one filter is enabled when said coding parameters are not similar, and said at least one filter is disabled when said coding parameters are similar.

15. A codec according to claim 14 wherein said identified coding parameters comprise at least one parameter taken from the group consisting of motion vector data, reference image frame data, reference image block data D.C. component data in a transform coefficient and A.C. component data in a transform coefficient.

16. A method for selective image filtering, said method comprising:
dividing an original image into a plurality of channels, said channels comprising a luminance channel and a chrominance channel;
identifying a target block and an adjacent block in at least one of said channels, wherein said target block is immediately adjacent to said adjacent block;
identifying an interblock boundary along a line between pixels in said target block and pixels in said adjacent block that are immediately adjacent to said pixels in said target block;
identifying coding parameters for said target block and said adjacent block in said at least one channel;
comparing said coding parameters;
selectively filtering only within a portion of said target block and said adjacent block that is proximate to said interblock boundary when said coding parameters are dissimilar.

17. A method for selective image filtering, said method comprising:
dividing an original image into a plurality of channels, said channels comprising a luminance channel and at least one chrominance channel wherein each channel comprises a channel image;
identifying a target block and an adjacent block in one of said channel images;
identifying an interblock boundary along a line between boundary pixels in said target block and boundary pixels in said adjacent block that are immediately adjacent to said boundary pixels in said target block;
identifying coding parameters for said target block and said adjacent block in said at least one of said channels;
comparing said coding parameters; and
filtering only within a portion of said channel image, wherein said portion being proximate to said interblock boundary when said coding parameters for said target block and said adjacent block are dissimilar and skipping said filtering when said coding parameters are similar.

18. A method as described in claim 17 wherein said coding parameters are related to a luminance channel and said filtering is applied to all channels.

19. A method as described in claim 17 wherein said coding parameters are related to a luminance channel and said filtering is applied to a chrominance channel.

20. A method as described in claim 17 wherein said coding parameters are related to a luminance channel and said filtering is applied only to said luminance channel.

21. A method as described in claim 17 wherein said coding parameters are related to a chrominance channel and said filtering is applied to said chrominance channel.

* * * * *